INVENTORS
WALTER PARFOMAK
LEON TYSKO
BY Ronald G. Gillespie
ATTORNEY

Feb. 16, 1971 W. PARFOMAK ET AL 3,564,381

A.C. SYNCHRONOUS TRANSMITTER, D.C. SYNCHRONOUS RECEIVER SYSTEM WITH DEMODULATORS IN ONLY TWO OF THE THREE WINDINGS

Filed Dec. 19, 1968

3 Sheets-Sheet 2

INVENTORS
WALTER PARFOMAK
LEON TYSKO
BY Ronald G. Gillespie
ATTORNEY

Feb. 16, 1971 W. PARFOMAK ET AL 3,564,381

A.C. SYNCHRONOUS TRANSMITTER, D.C. SYNCHRONOUS RECEIVER SYSTEM WITH DEMODULATORS IN ONLY TWO OF THE THREE WINDINGS

Filed Dec. 19, 1968 3 Sheets-Sheet 3

INVENTORS:
WALTER PARFOMAK
LEON TYSKO

BY Ronald G. Gillespie
ATTORNEY

United States Patent Office 3,564,381
Patented Feb. 16, 1971

3,564,381

A.C. SYNCHRONOUS TRANSMITTER, D.C. SYNCHRONOUS RECEIVER SYSTEM WITH DEMODULATORS IN ONLY TWO OF THE THREE WINDINGS

Walter Parfomak, Wallington, and Leon Tysko, Fairlawn, N.J., assignors to The Bendix Corporation, a corporation of Delaware Filed Dec. 19, 1968, Ser. No. 785,137
Int. Cl. G05b *11/12*
U.S. Cl. 318—23.5 8 Claims

ABSTRACT OF THE DISCLOSURE

An indicating system having alternating current synchro transmitters providing alternating current signals corresponding to a condition, each transmitter has three stator windings connected back to back with a direct current synchro receiver having three stator windings. Demodulators are connected in two of the back to back connections. The demodulators comprise a pair of transistors of opposite conductivity type controlled by an alternating current voltage phase related to the alternating current signals.

CROSS REFERENCES TO RELATED APPLICATIONS

The present invention relates to an indicating system such as that disclosed and claimed in a copending U.S. application Ser. No. 785,133 filed Dec. 19, 1968, by Richard L. Cohen and assigned to The Bendix Corporation, assignee of the present invention.

BACKGROUND OF THE INVENTION

Field of the invention

This invention relates to synchro systems and, more particularly, to a synchro system used for indication purposes.

Description of the prior art

Synchro indicating systems such as that disclosed and claimed in the aforementioned U.S. application Ser. No. 785,133 heretofore used a demodulator between each connection between the alternating current synchro transmitters and the direct current synchro receivers. The present invention demodulates the alternating current signals from the transmitters while using one less demodulator between the connections between a transmitter and a receiver, thus reducing power requirements, size, weight and cost and improving the reliability of the present invention.

The indicating system disclosed in U.S. application Ser. No. 785,133 also uses either NPN or PNP transistors in each demodulator which requires the application of a separate biasing voltage for each transistor. The present invention overcomes this disadvantage by using a NPN and a PNP transistor in each demodulator. Each demodulator needs only one voltage to bias the two transistors. Since each biasing voltage is provided by a secondary winding of a transformer, the number of secondary windings is correspondingly reduced. This further reduces the size, weight, cost and power requirements of the present invention.

In the aforementioned disclosed indicating system, the biasing voltage is applied to one emitter-base junction. The present invention is more reliable because the biasing voltage applied across two emitter-base junctions reduces the probability of the biasing voltage breaking down an emitter-base junction.

SUMMARY OF THE INVENTION

An indicating system having alternating current synchro transmitters providing alternating current signals corresponding to a condition, each transmitter has three stator windings connected back to back with a direct current synchro receiver having three stator windings. Demodulators are connected in two of the back to back connections. The demodulators comprise a pair of transistors of opposite conductivity type controlled by an alternating current voltage phase related to the alternating current signals. The demodulated signals control direct current synchro receivers operating an indicator for indicating the condition.

One object of the invention is to provide an indicating system of fewer parts less size and weight, and which requires less power and is more reliable than indicating systems used heretofore.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
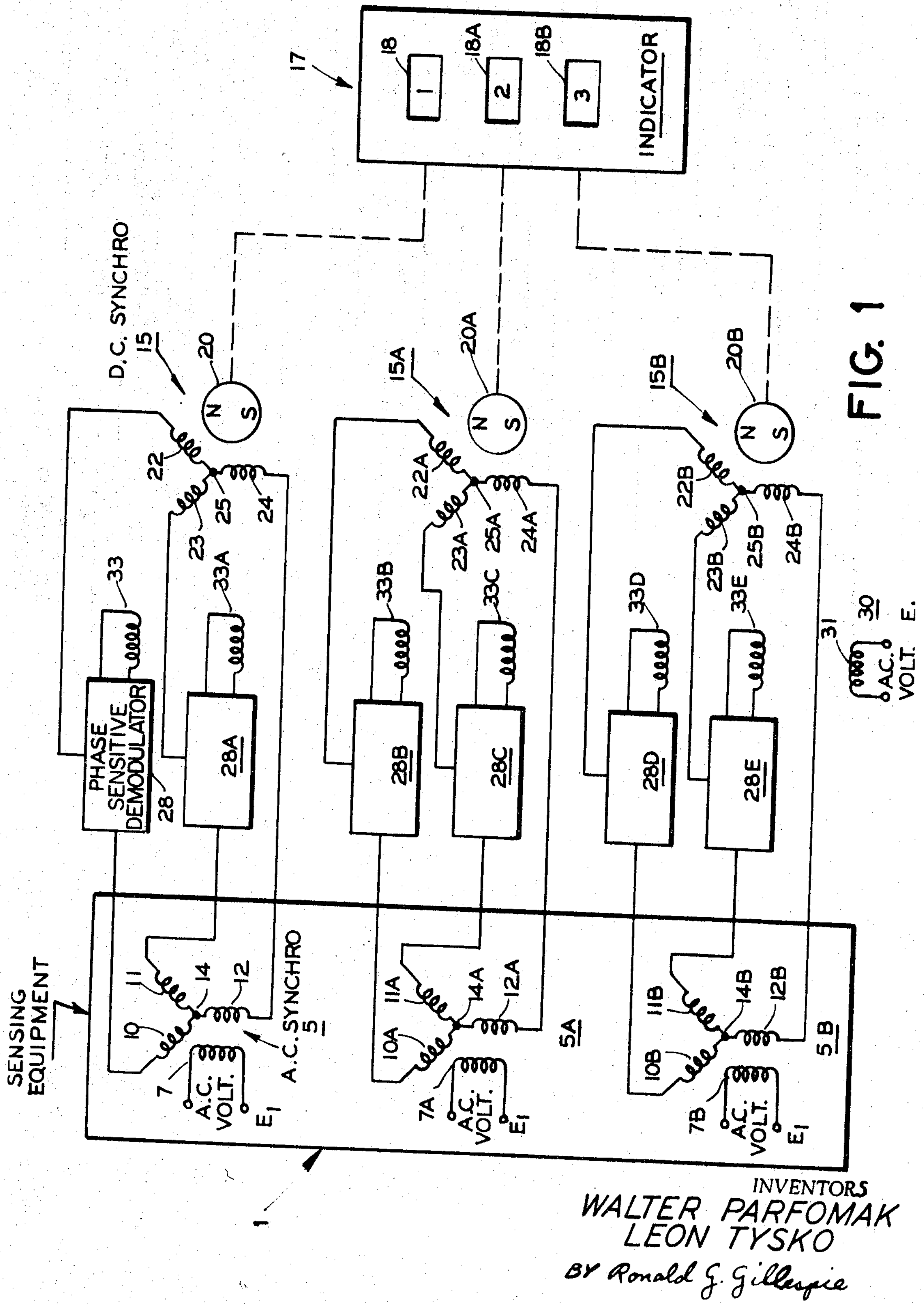
FIG. 1 is a block diagram of a novel indicating system constructed according to the invention for indicating a numeral with three digits.

Referring to FIG. 1 there is shown a novel indicating system including sensing equipment 1 having alternating current synchros 5, 5A and 5B providing alternating current signals corresponding to a condition. Synchro 5 has a rotor winding 7 positioned in accordance with the condition and energized by an alternating current voltage $E_1$ and stator windings 10, 11 and 12 having a common connection 14. Synchros 5A and 5B have similar rotor windings and stator windings with corresponding numbers having suffixes A and B. Direct current synchros 15, 15A and 15B operate an indicator 17 in response to the signals and indicate the condition with three numerals 18, 18A and 18B. Direct current synchro 15 has a permanent magnet rotor 20 and stator windings 22, 23 and 24 having a common connection 25. Synchros 15A and 15B have a similar rotor and stator winding with corresponding numbers having suffixes A and B.

Phase sensitive demodulators 28 and 28A connect stator windings 10 and 11 of alternating current synchro 5 to stator windings 22 and 23, respectively, of direct current synchro 15 and stator winding 12 is connected directly to stator winding 24. Phase sensitive demodulators 28B and 28C connect stator windings 10A and 11A of alternating current synchro 5A to stator windings 22A and 23A, respectively, of direct current synchro 15A and stator winding 12A is connected directly to stator winding 24A. Phase sensitive demodulators 28D and 28E connect stator windings 10B and 11B of alternating current synchro 5B to stator windings 22B and 23B, respectively, of direct current synchro 15B and stator winding 12B is connected directly to stator winding 24B. Phase sensiitve demodulators 28, 28A, 28B, 28C, 28D and 28E are identical demodulators and demodulate the alternating current signals.

A transformer 30 has a primary winding 31 energized by alternating current voltage $E_1$, and secondary windings 33, 33A, 33B, 33C, 33D and 33E providing alternating current voltages induced by alternating current voltage $E_1$. Secondary winding 33 is connected to phase sensitive demodulator 28, as hereinafter explained, the remaining secondary windings are similarly connected to phase sensitive demodulators bearing the same suffixes. The transformer 30 is used for isolation purposes.

Figure 2:
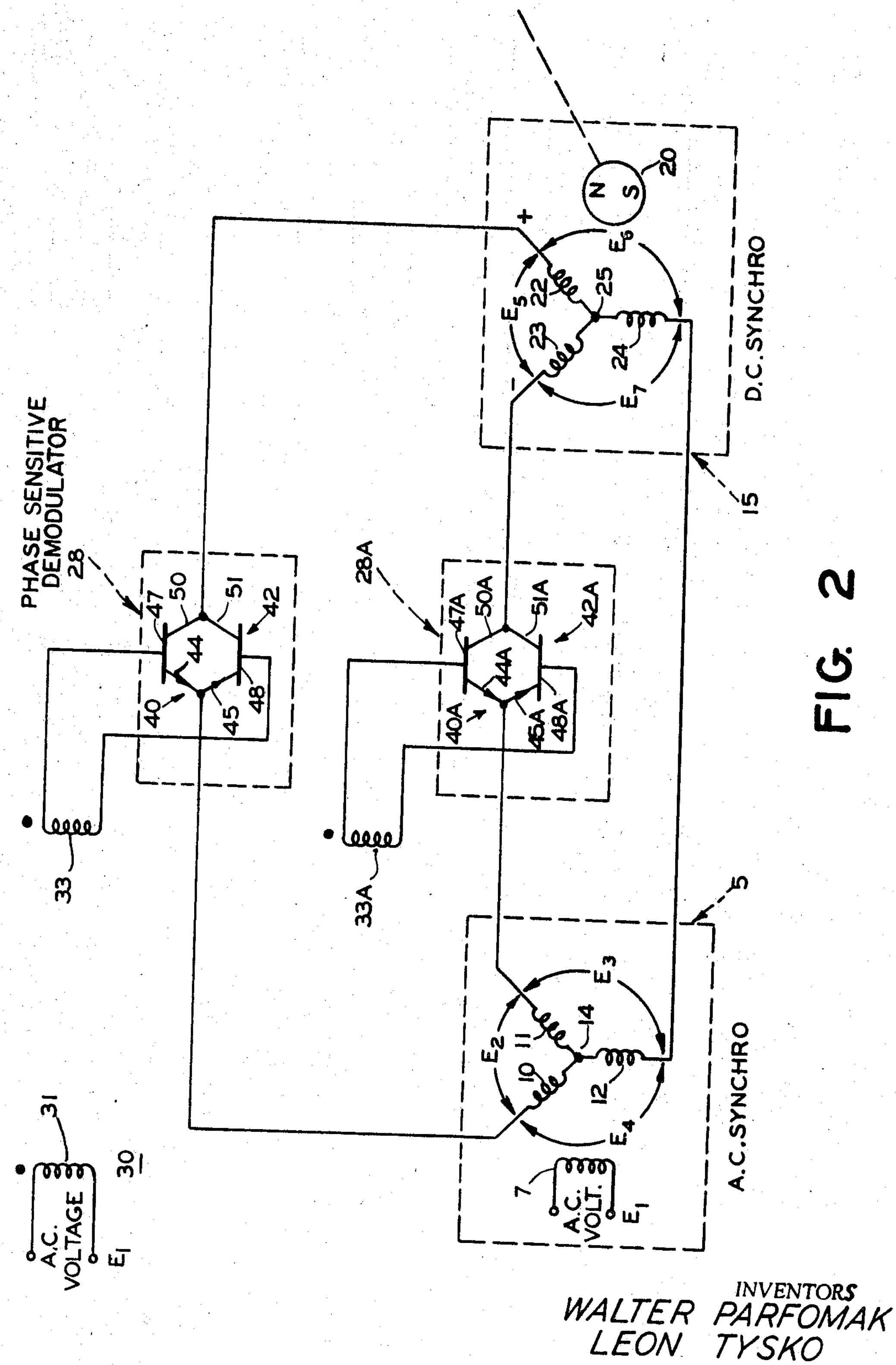
FIG. 2 is a schematic diagram for indicating one digit in the system shown in FIG. 1.

Referring to FIG. 2 there is shown a schematic diagram for indicating one digit 18. Synchro 5 is shown as having rotor winding 7 angularly positioned to correspond to the condition. Winding 7 is energized by alternating current voltage $E_1$. Synchro 5 also has stator windings 10, 11 and 12 providing alternating current signals $E_2$, $E_3$ and $E_4$ corresponding to the angular position of rotor winding 7.

Phase sensitive demodulator 28 includes a NPN transistor 40 and a PNP transistor 42 having emitters 44 and 45, bases 47 and 48, and collectors 50 and 51, respectively. Emitters 44 and 45 of transistors 40 and 42 are connected to stator winding 10 of synchro 5. Collectors 50 and 51 of transistors 40 and 42 are connected to stator winding 22 of synchro 15. Bases 47 and 48 of transistors 40 and 42 are connected to opposite ends of secondary winding 33 of transformer 30.

When the induced alternating current voltage applied by secondary winding 33 is more positive at base 47 of transistor 40 than at base 48 of transistor 42, transistors 40 and 42 are forward biased. Transistors 40 and 42 are back biased when the induced alternating current voltage is more positive at base 48 of transistor 42 than at base 47 of transistor 40.

Phase sensitive demodulator 28A is identical to phase controlled rectifier 28, and has similar elements with corresponding numerals bearing the suffix A and is connected in the same manner to secondary winding 33A of transformer 30. Phase sensitive demodulator 10A connects stator winding 11 of synchro 5 to stator winding 23 of synchro 15 and stator winding 12 of synchro 5 is connected directly to stator winding 24 of synchro 15.

Rotor 20 of synchro 15 angularly follows rotor winding 7 of synchro 5 and is positioned according to a magnetic field established by current flowing through stator windings 22, 23 and 24. Rotor 20 of synchro 15 is mechanically connected to indicator 17, as indicated by the dash line in FIG. 1, for displaying one digit 18 of the three digit numeral.

OPERATION

Figure 3:
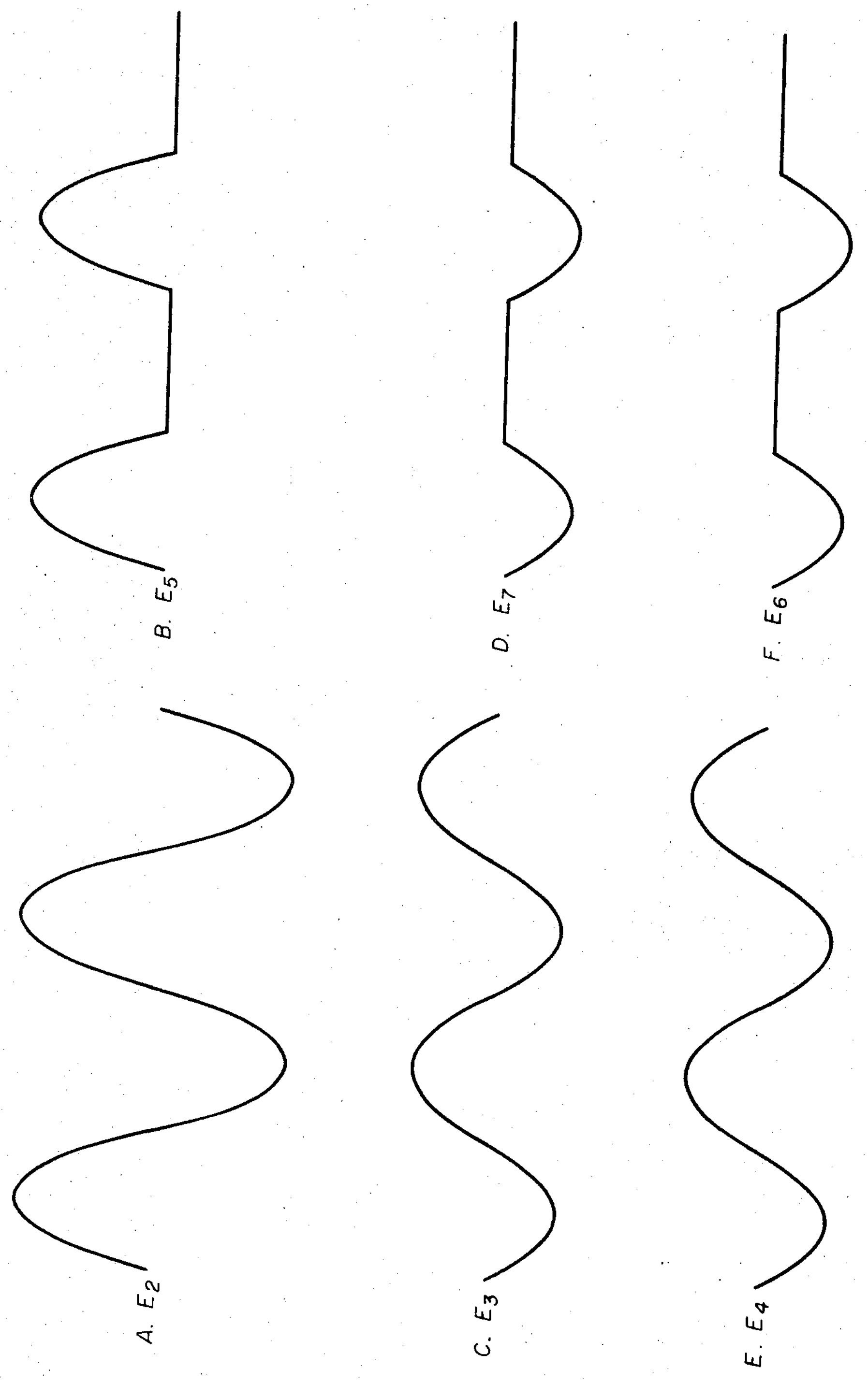
FIGS. 3A through 3F show operating voltages of the phase sensitive demodulator shown in FIG. 2.

Referring to FIG. 2, during half cycles of the alternating current voltage $E_1$, transistors 40 and 42 and 40A and 42A in phase sensitive demodulators 28 and 28A, respectively, are forward biased by the induced alternating current voltages provided by secondary windings 33 and 33A of transformer 30. When the alternating current signal $E_2$, shown in FIG. 3A, is in phase with the induced alternating current voltages, the voltage at emitters 44 and 45 node in phase sensitive demodulator 28 is more positive than the voltage at collectors 50 and 51 node causing transistor 42 to conduct. The voltage at collectors 50A and 51A node in phase sensitive demodulator 28A is more positive than the voltage at emitters 44A and 45A node causing transistor 40A to conduct. During the other half cycles of alternating current voltage $E_1$, all transistors are back biased by the induced alternating current voltages provided by secondary windings 33 and 33A of transformer 30 so that the transistors are non-conductive. The alternate conducting and non-conducting of transistors 42 and 40A demodulates alternating current signal $E_2$. Phase sensitive demodulators 28 and 28A apply a demodulated signal $E_5$, shown in FIG. 3B, across stator windings 22 and 23 of direct current synchro 15 having the polarity indicated in FIG. 2.

When the alternating current signal $E_2$ is out of phase with the induced alternating current voltages provided by secondary windings 33 and 33A of transformer 30, half cycles of the induced alternating current voltages still forward bias transistors 40 and 42, and 40A and 42A in phase sensitive demodulators 28 and 28A, respectively. The voltage at collectors 50 and 51 node in phase sensitive demodulator 28 is more positive than the voltage at emitters 44 and 45 node so that transistor 40 conducts. The voltage at emitters 44A and 45A node in phase sensitive demodulator 28A is more positive than the voltage at collectors 50A and 51A node so that transistor 42A conducts. During the other half cycles of the induced alternating current voltages provided by secondary windings 33 and 33A, all transistors are back biased so that the transistors are non-conductive. The alternate conducting and non-conducting of transistors 40 and 42A demodulates alternating current signal $E_2$. Demodulated signal $E_5$ has an opposite polarity to that shown in FIG. 2 when alternating current signal $E_2$ is out of phase with the induced alternating current voltages provided by secondary windings 33 and 33A of transformer 30.

Alternating current signals $E_3$ and $E_4$, shown in FIGS. 3C and 3E, respectively, are demodulated in a similar manner by transistor 40A or 42A in phase controlled rectifier 28A and transistor 40 or 42 in phase sensitive demodulator 28, respectively to provide signals $E_7$ and $E_6$, respectively, as shown in FIGS. 3D and 3F.

The rectified signals $E_5$, $E_6$ and $E_7$ applied to stator windings 22, 23 and 24 of synchro 15 create a magnetic field causing rotor 20 to follow rotor winding 7 of synchro 5. Rotor 20 of synchro 15 operates one digit 18 of indicator 17.

Although a three digit indicating system is shown, more digits can be displayed with corresponding increases in the number of alternating current synchros, direct current synchros and phase sensitive demodulators.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A synchro system comprising an alternating current synchro providing alternating current signals corresponding to a condition, a direct current synchro connected back to back by at least three connections to the alternating current synchro and phase sensitive demodulating controlled rectifying means in two of the connections for rectifying demodulating the alternating current signals to provide demodulated signals having polarities corresponding to the phases irrespective of a phase reversal of the alternating current signals.

2. A synchro system as described in claim 1 further comprising means connected to the direct current synchro for indicating the condition in accordance with the output from the direct current synchro.

3. A synchro system as described in claim 1 in which the phase controlled rectifying means includes switching means connecting the alternating current synchro and the direct current synchro and controlled by alternating current voltages phase related to the alternating current signals to rectify the alternating current signals.

4. A synchro system as described in claim 3 in which each switching means includes a NPN and a PNP transistor, each having an emitter, a collector and a base, and the emitter and the collector of one transistor are connected to the emitter and the collector, respectively, of the other transistor, one connection between the transistors is connected to the alternating current synchro, the other connection between the transistors is connected to the direct current synchro, and the bases of both transistors are connected so that both transistors are biased by an alternating current voltage causing one transistor to pass an alternating current signal during half cycles of the alternating current voltage and block the alternating current signal during the other half cycles.

5. A synchro system as described in claim 3 in which the phase related alternating current voltages are provided by a transformer having a primary winding energized by an alternating current voltage, phase related to the alternating current signals, and having secondary windings connected to the switching means for isolating the switching means form the energizing alternating current voltage.

6. A phase sensitive demodulator for rectifying an alternating current signal subject to phase reversal, comprising switching means controlled by an alternating current voltage phase related to the alternating current signal and including a NPN and a PNP transistor, each having an emitter, a base and a collector; and the emitter and the collector of one transistor are connected to the emitter and the collector, respectively, of the other transistor, with one connection between the transistors receiving the alternating current signal, and the bases of the transistors are connected so that both transistors are biased by the alternating current voltage causing one transistor to pass the alternating current signal to the other connection between the transistors during half cycles of an alternating current voltage and to block the alternating current signal during the other half cycles so as to rectify the alternating current signal irrespective of a phase reversal of the signal.

7. A phase sensitive demodulator as described in claim 6 in which the phase related alternating current voltage is provided by a transformer having a primary winding energized by an alternating current voltage phase related to the alternating current signal, and having a secondary winding connected to the switching means so as to isolate the switching means from the energizing alternating current voltage.

8. A phase sensitive demodulator as described in claim 1 in which the alternating current synchro has Y connected stator windings, and the direct current synchro has Y connected stator windings.

References Cited

UNITED STATES PATENTS

| | | | |
|---|---|---|---|
| 2,418,193 | 4/1947 | Peterson | 318—23 |
| 2,935,660 | 5/1960 | Patchell | 318—20.835X |

THOMAS E. LYNCH, Primary Examiner

U.S. Cl. X.R.

318—648, 692; 340—198